US007185774B2

(12) United States Patent
Colgate et al.

(10) Patent No.: US 7,185,774 B2
(45) Date of Patent: Mar. 6, 2007

(54) METHODS AND APPARATUS FOR MANIPULATION OF HEAVY PAYLOADS WITH INTELLIGENT ASSIST DEVICES

(75) Inventors: J. Edward Colgate, Evanston, IL (US); Paul F. Decker, Chicago, IL (US); Stephen H. Klostermeyer, Arlington Heights, IL (US); Alexander Makhlin, Chicago, IL (US); David Meer, Skokie, IL (US); Julio Santos-Munne, Glenview, IL (US); Michael A. Peshkin, Evanston, IL (US); Michael Robie, Schaumburg, IL (US)

(73) Assignee: The Stanley Works, New Britain, CT (US)

( * ) Notice: Subject to any disclaimer, the term of this patent is extended or adjusted under 35 U.S.C. 154(b) by 32 days.

(21) Appl. No.: 10/431,582

(22) Filed: May 8, 2003

(65) Prior Publication Data

US 2004/0026349 A1 Feb. 12, 2004

Related U.S. Application Data

(60) Provisional application No. 60/378,813, filed on May 8, 2002.

(51) Int. Cl.
*G06F 19/00* (2006.01)

(52) U.S. Cl. ........................ 212/331; 212/270; 700/213

(58) Field of Classification Search ................ 212/271, 212/328, 270, 331
See application file for complete search history.

(56) References Cited

U.S. PATENT DOCUMENTS

| | | | | |
|---|---|---|---|---|
| 3,469,164 | A | 9/1969 | Truemper et al. | |
| 5,350,075 | A | 9/1994 | Kahlman | |
| 5,850,928 | A | 12/1998 | Kahlman et al. | |
| 5,923,139 | A | 7/1999 | Colgate et al. | |
| 5,952,796 | A | 9/1999 | Colgate et al. | |
| 6,204,620 | B1 | 3/2001 | McGee et al. | |
| 6,241,462 | B1 * | 6/2001 | Wannasuphoprasit et al. | 414/800 |
| 6,313,595 | B2 * | 11/2001 | Swanson et al. | 318/568.11 |
| 6,394,731 | B1 * | 5/2002 | Konosu et al. | 414/5 |
| 6,796,447 | B2 * | 9/2004 | Laundry et al. | 212/275 |
| 6,907,317 | B2 * | 6/2005 | Peshkin et al. | 700/245 |

FOREIGN PATENT DOCUMENTS

| | | |
|---|---|---|
| DE | 297 19 865 U1 | 3/1998 |
| EP | 1 020 786 A2 | 7/2000 |
| WO | WO 90/13508 | 11/1990 |
| WO | WO 99/21687 | 5/1999 |
| WO | WO 01/32547 | 5/2001 |

* cited by examiner

*Primary Examiner*—Thomas J. Brahan
(74) *Attorney, Agent, or Firm*—Pillsbury Winthrop Shaw Pittman LLP

(57) ABSTRACT

An intelligent assist method and apparatus are disclosed. The intelligent assist method includes imparting a manual force to a suspended object, determining an angle at which the suspended object is manually forced, generating motorized power to move the object in accordance with the angle at which the suspended object is forced, and inputting a signal to continue the motorized power and enable the object to continue moving on accordance with the angle at which the suspended object is manually forced.

11 Claims, 12 Drawing Sheets

METHODS AND APPARATUS FOR MANIPULATION OF HEAVY PAYLOADS WITH INTELLIGENT ASSIST DEVICES

CROSS-REFERENCE TO RELATED APPLICATIONS

This application claims the benefit of priority to U.S. Provisional Application No. 60/378,813, titled "METHODS AND APPARATUS FOR MANIPULATION OF HEAVY PAYLOADS WITH INTELLIGENT ASSIST DEVICES," filed May 8, 2002, which is incorporated by reference herein in its entirety.

BACKGROUND OF THE INVENTION

1. Field of the Invention

This present invention relates to the field of programmable robotic manipulators and assist devices, and more particularly to robotic manipulators and assist devices that can interact with human operators for the manipulation of heavy payloads.

2. Description of Related Art

In an industrial application such as a manufacturing assembly line or a general material handling situation, the payload may be too large for a human operator to move without risking injury. Even with lighter loads, it may be desirable to provide mechanical assistance to a human operator in order to allow more rapid movement and assembly and to avoid strain and fatigue. Thus, a great deal of industrial assembly and material handling work is done with the help of assist devices, such as overhead bridge rail systems.

Overhead bridge rail systems are also known in the art as "bridge cranes" or "xy rail systems." One type of powered overhead bridge crane runs on I-beams and are typically used for heavy loads. Powered bridge cranes are relatively slow and are usually directionally controlled by a human-controlled pushbutton-type device that is coupled to the crane. Manipulating the system to get the payload to its desired position can be a challenge due to the slow speed of the crane and the tedious manipulation of the input device required to yield the desired path.

Also, there are unpowered overhead rail systems that are typically used for lighter loads. Unpowered overhead rail systems utilize low-friction rails and are moved by the direct application of the user's force to the payload. Unpowered rail systems are typically faster and easier to use, and allow greater operator dexterity.

However, a number of problems plague unpowered overhead rail systems. First, it can be difficult to accelerate the payload. Frequently, this involves forward pushing, which uses the large muscles of the lower body. Even so, considerable effort is required to accelerate larger payloads that are typically above about 200 lbs. Second, controlling or steering the motion of the moving payload is an even greater problem, as it requires pulling sideways with respect to the payload's direction of motion, generally using the smaller muscles of the upper body and back. Third, stopping the motion of the payload, as well as the crane itself, is also a significant problem. Even if the operator pulls hard enough to stop the payload motion, the crane will continue traveling, thereby requiring an extra pulse of stopping force.

Anisotropy is a further problem with an unpowered system. Although a low-friction design is used, both the friction and the inertia are greater in the direction in which the payload has to carry the whole bridge rail with it than in the direction in which the payload simply moves along the bridge rail. Anisotropy produces an unintuitive response of the payload to applied user forces, and often results in the user experiencing a continuous sideways "tugging" as the payload moves, in order to keep it on the desired path.

In conventional rail systems, if the operator suddenly stops moving the payload, for unpowered rail systems, or stops commanding the motion of the overhead carriage, for powered bridge cranes, the payload may tend to swing up and back below its support point. Swinging causes delay and difficulty in positioning the payload.

SUMMARY OF THE INVENTION

At least one embodiment of the present invention may provide an intelligent assist device ("IAD") that includes the desirable features of both types of overhead bridge rail systems, including the powered assistance currently available with bridge cranes, but with the quick and intuitive operator interface that previously was available only from unpowered rail systems.

Such embodiments may provide a rail system with improved ergonomic performance.

Embodiments may also provide an IAD that can accommodate larger payloads than current unpowered rail systems allow.

Embodiments may be described herein as relating to an intelligent assist method that includes, for example, imparting a manual force to a suspended object, determining an angle at which the suspended object is manually forced, generating motorized power to move the object in accordance with the angle at which the suspended object is forced, and inputting a signal to continue the motorized power and enable the object to continue moving on accordance with the angle at which the suspended object is manually forced.

Embodiments may further include an intelligent assist system that includes, for example, a crane with a cable, an angle sensor that measures a cable angle, at least one motorized trolley, a controller coupled to the sensor and the at least one motorized trolley, and input means for generating an input signal to the controller. The controller may include a velocity determining application to configure the controller to determine velocity command values for the at least one motorized trolley, wherein the controller determines the velocity command values based on the cable angle and the input signal.

These and other aspects of embodiments of the invention will become apparent when taken in conjunction with the following detailed description and drawings.

BRIEF DESCRIPTION OF THE DRAWINGS

Features of the invention are shown in the drawings, which form part of this original disclosure. Embodiments of the invention will be described in conjunction with the following drawings, in which.

DETAILED DESCRIPTION OF EMBODIMENTS OF THE INVENTION

Figure 1A:
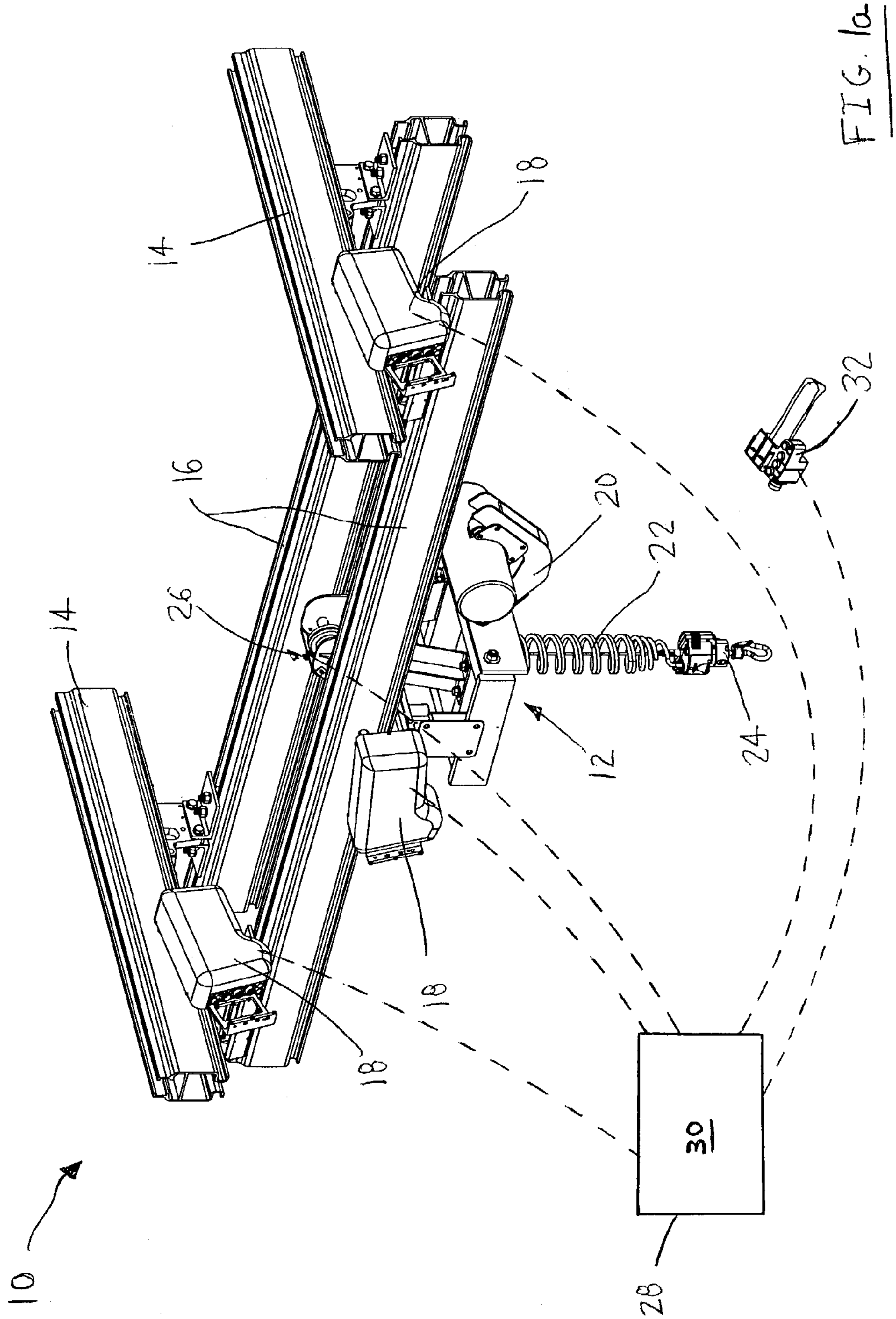
FIG. 1*a* is a top perspective view of at least one embodiment of an intelligent assist device according to the present invention.

Intelligent Assist Devices ("IADs") are computer-controlled machines that aid a human worker in moving a payload. IADs may provide a human operator a variety of types of assistance, including supporting payload weight, helping to overcome friction or other resistive forces, helping to guide and direct the payload motion, and moving the payload without human guidance.

A modular IAD architecture that solves the problems discussed above for payloads weighing up to approximately 200–250 lbs. has been disclosed in commonly owned, co-pending U.S. patent application Ser. No. 09/781,683, filed Feb. 12, 2001, now U.S. Pat. No. 6,928,336, issued on Aug. 9, 2005, and U.S. patent application Ser. No. 09/781,801, filed Feb. 12, 2001, now U.S. Pat. No. 6,813,542, issued on Nov. 2, 2004, all of which are incorporated by reference herein in their entireties. However, the previously disclosed architectures may not be suitable for heavier payloads, such as payloads exceeding about 300 lbs., because such architectures require the operator to provide the force needed to move the payload itself.

There are two classes of IADs: cable-based and rigid descenders. Cable-based IADs suspend the load from a cable or chain. Rigid descenders support the load with a rigid member, allowing for the support of offset loads and are often used when it is necessary to place a component under an overhang.

Cable-based IADs may utilize cable angle sensing. In a conventional unpowered system, for example, the operator must apply enough force to accelerate not only the payload, but the overhead structure as well. Since all force is transmitted to the overhead structure via cable tension, the operator must create a fairly large cable angle to transmit sufficient force to the overhead structure. In contrast, in an IAD, the crane is powered and the cable angle is measured. The cable angle may be measured with a true angle sensor or it may be inferred from one or more measurements of the cable's horizontal displacement.

As the operator begins to accelerate the payload, the measured cable angle may be used in forming a velocity command for the motorized units, also known as motorized trolleys, that move the crane. Thus, it is the operator that accelerates the payload and the trolleys that accelerate the crane. One consequence of this approach is that the cable angle never departs very much from the vertical because the trolleys keep up with the movement of the payload.

Once the payload is in motion, the unpowered crane tends to continue moving with no additional force, due to its inertia. Therefore, the cable stays in the almost vertical position. In the case of the IAD, however, the crane velocity is proportional to the cable angle, so it is necessary for the operator to maintain a small cable angle. Therefore, a force is necessarily associated with this small cable angle.

With an unpowered crane, when it is time to stop payload motion, an operator must first decelerate the payload. The crane, however, will continue to move until a sufficiently large cable angle is developed to slow it down, a phenomenon known as "overtravel." The result is that the operator must apply very large stopping forces. With the IAD, however, the operator need only stop pushing and the payload and crane will quickly come to rest, thereby eliminating the need for stopping forces. Furthermore, with the IAD the overhead carriage may actively maintain its position directly above the payload's center of mass such that the swinging motion is substantially reduced or entirely arrested.

In at least one embodiment of the present invention, the IAD may help accelerate the payload, and not just the crane, upon initial movement. In such embodiments, the IAD may require zero or near-zero effort by the operator to keep the payload in motion and the payload may stop without significant effort by the operator.

The system and method disclosed herein may be implemented using, for example, an xy overhead rail system of a known type. It should be understood, however, that the present embodiments are not limited to the overhead rail systems disclosed herein, but are equally applicable to other crane designs, such as jib cranes. In the case of jib cranes, however, details of the control algorithms must be changed according to well-known mathematics in order to accommodate the rθ geometry.

Figure 1B:
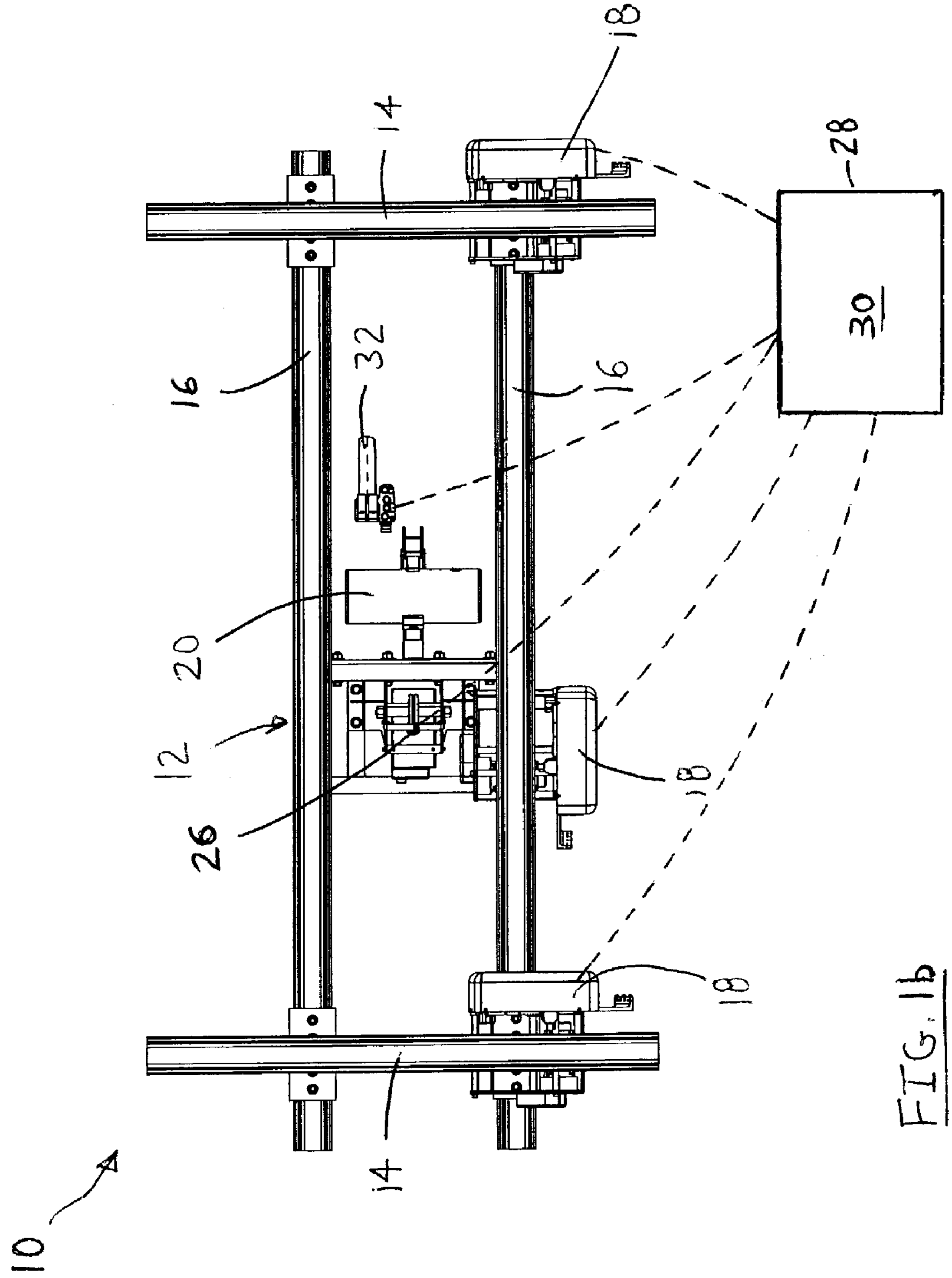
FIG. 1*b* is a top view of at least one embodiment of the intelligent assist device of FIG. 1*a;*

FIGS. 1*a* and 1*b* show at least one embodiment of an intelligent assist system 10, or IAD, of the present invention. As illustrated in FIGS. 1*a* and 1*b*, the IAD system 10 may include a bridge crane 12. The bridge crane 12 may include two sets of rails, including fixed runway rails 14 and bridge rails 16, that are disposed perpendicular to each other. This provides the bridge crane 12 with two horizontal axes of motion, the first along the bridge rails 16 and the second perpendicular to the bridge rails 16, along the fixed runway rails 14. Although one or both axes may be powered, preferably both axes are powered, as shown in FIGS. 1*a* and 1*b*.

The IAD system 10 illustrated in FIGS. 1*a* and 1*b* may also include motorized trolleys 18 that ride along the rails 14, 16. If both axes are powered, the relative velocities of the motorized trolleys 18 that act along each axis must be controlled so that the correct overall heading results.

The bridge crane 12 may also include a vertical axis lifting device 20 that is coupled to at least one motorized trolley 18 that is disposed on the bridge rail 16. A cable 22 may be coupled to the lifting device 20 at one end and a payload attachment 24 at the opposite end. A cable angle sensor 26 may be disposed on the lifting device 20, adjacent the cable 22.

The cable angle sensor 26 may be disposed such that it senses any deflection of the cable 22 outside of the vertical plane. The cable angle sensor 26 may measure the deflection in two components: one for the component of cable angle in the direction of the bridge rails 16, and one for the component of cable angle in the direction of the fixed runway rails 14. Each component may be used in computing a velocity command for the associated motorized trolley 18.

The cable angle sensor 26 and motorized trolleys 18 may be coupled to a controller 28. The controller 28 may include an application 30 that includes a sequence of programmed instructions. Preferably, the controller 28 is a computer system 200, an example of which is shown in FIG. 2.

Figure 2:
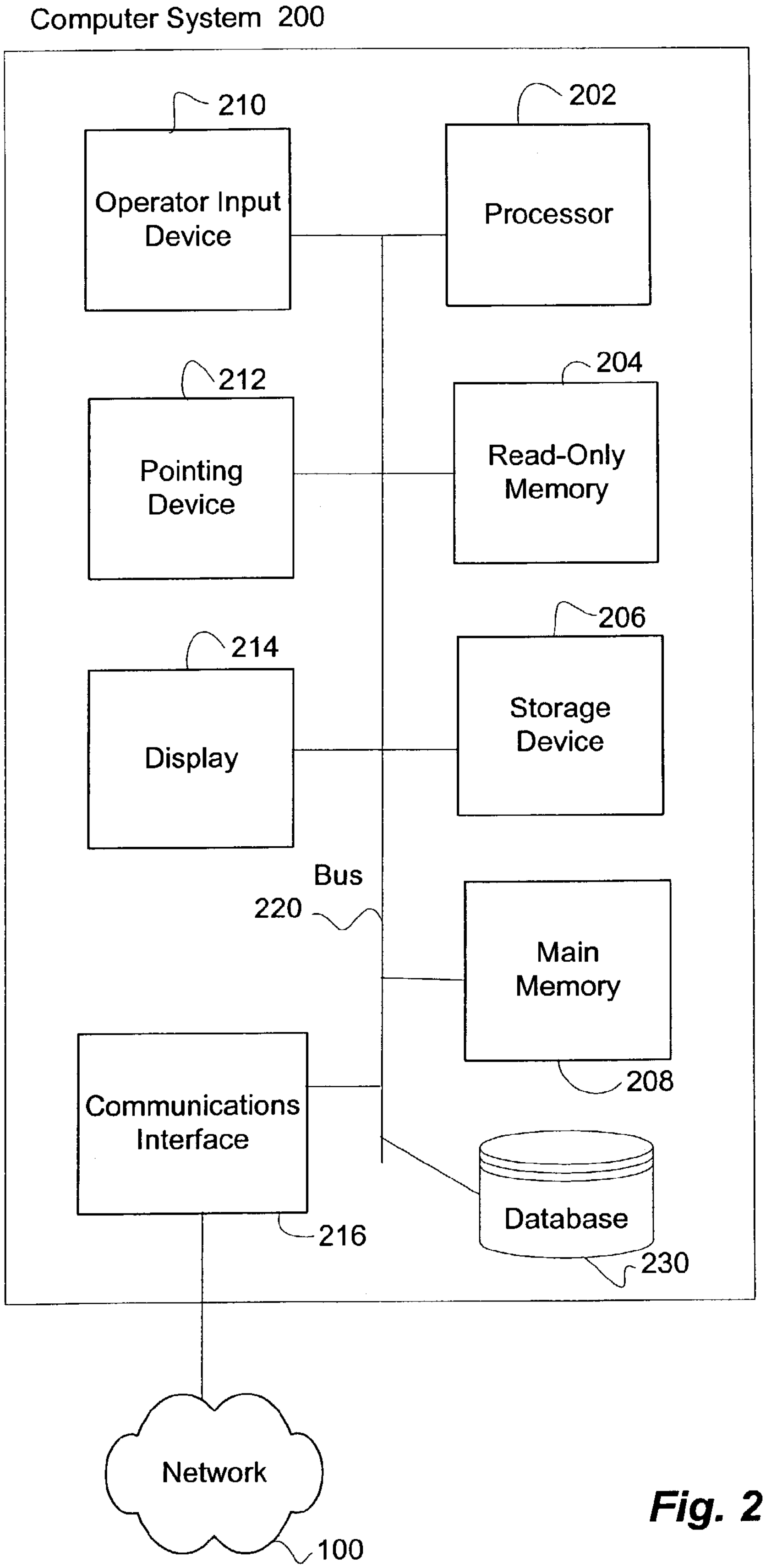
FIG. 2 is a schematic of a computer system of at least one embodiment.

FIG. 2 illustrates a computer system 200 that may be used in at least one embodiment of the present invention. The computer system 200 may include a processor 202, read-only memory 204, a storage device 206, main memory 208, at least one operator input device 210, a pointing device 212, a display 214, a communications interface 216, a bus 220 and a database 230. The components of the computer system 200 may be of known and conventional types, with the exception of the operator input device 210. For example, the pointing device 212 may be a mouse, stylus, touch screen, or the like. The at least one operator input device 210 may include a keyboard, and may also include operator input devices that are discussed in greater detail below. As shown in FIG. 2, the computer system 200 may, in some embodiments, be coupled to a network 100 using the communications interface 216.

Figure 3:
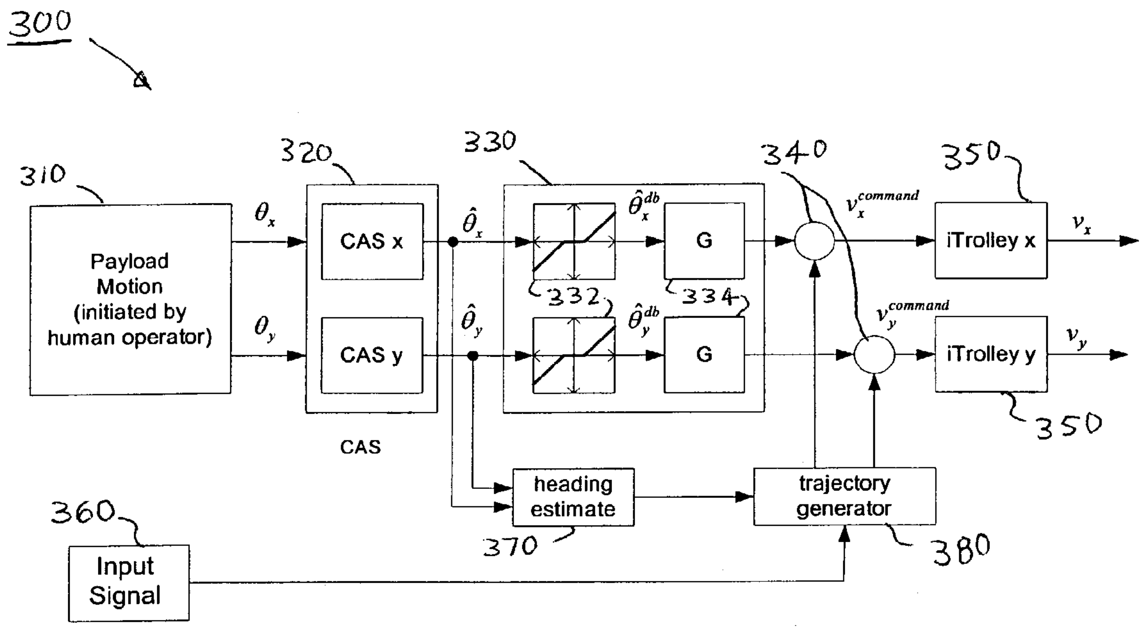
FIG. 3 is a schematic of a control diagram of at least one embodiment.

As described above, the IAD system 10 may obtain both desired heading and desired speed information from the cable angle sensor readings, as illustrated for the example control system 300 in FIG. 3. As illustrated in FIG. 3, when an operator pushes on the payload at 310, the cable may be deflected in both the x-direction ($\theta_x$) and the y-direction ($\theta_y$), depending on direction of push. The cable angle sensor ("CAS") may measure these components, resulting in the estimates $\hat{\theta}_x$ and $\hat{\theta}_y$. These estimates may be converted to velocity commands for the motorized trolleys ("iTrolley x" and "iTrolley y") at 330. Specifically, these estimates may be each passed through a deadband function at 332, resulting in $\hat{\theta}_x^{db}$ and $\hat{\theta}_y^{db}$.

The deadband function may ignore signals below a certain threshold, which keeps the IAD from moving in response to sensor noise or other spurious noise components. The estimates may then be multiplied by a gain (G) at 334 to produce x and y direction velocity command values ($v_x^{command}$ and $v_y^{command}$) for the iTrolleys. The iTrolleys may convert the velocity command values to velocities in the x and y directions at 350, thereby moving the crane in the desired direction at the desired speed. This approach allows for automatically determining a heading because the motorized trolleys move in the same direction in which the operator deflects the cable. However, the operator may need to apply significant forces for both starting and continuing motion, especially for heavy payloads.

There are several approaches to reducing operator forces that may be implemented without any change in the above described control structure. These approaches may include integral control, gain scheduling, and controllable brake trolleys.

For example, for integral control, instead of setting $$v_x^{command} = G\hat{\theta}_x^{db},$$

the velocity command value for the x direction may be set, such that:

$$v_x^{command} = G_1\hat{\theta}_x^{db} + G_2\int\hat{\theta}_x^{db}\,dt$$

and likewise for the y direction. The integral term may provide the velocity command "memory" of the cable angle. As a result, even after the angle returns to zero, the velocity command may persist. Thus, after an initial startup, the IAD may continue moving with no further effort from the operator. Note that in this approach stopping the load may take more force than it would in the absence of the integral term because the integral must be "drained." This may be addressed by increasing the gain $G_2$ when $\hat{\theta}_x^{db}$ changes sign, for example.

In at least one embodiment, the control system 300 may be implemented using programmed instructions of the application 30 and executed by the controller 28.

In another embodiment, the IAD may contain a load cell in-line with the cable. This load cell may be used to measure the weight of the payload. This measurement information, in turn, may be used to adjust the gain G or the size of the deadband. For instance, for larger loads, G may be increased and the deadband may be decreased. If the length of the cable can be measured with, for example, a cable-length sensor, then additional gain scheduling is possible. In particular, higher gains may be possible for longer cable lengths due to the lower pendulum frequencies that result.

As described above, in some instances the unpowered crane has some advantages to a conventional IAD in the case of ongoing motion because inertia keeps the unpowered crane moving in the absence of any cable angle, while some finite cable angle is required to keep the IAD moving. However, the IAD may be better at stopping because the inertia of the unpowered crane causes considerable overtravel. In another embodiment, a trolley that features a controllable brake may be used, such as a magnetic particle brake, rather than a motor. The brake may be engaged only for stopping. This approach may emulate an unpowered crane during starting and ongoing motion and an IAD for stopping. To further emulate an unpowered crane, a clutching mechanism may be used to completely disengage the brake during starting and ongoing motion.

In at least one embodiment, the IAD system 10 may further include an operator input device 32, as shown in FIGS. 1a and 1b. The operator input device 32 may be any device that can provide an input signal to the controller 28 that reflects the operator's intent of requesting additional assistance from the motorized trolleys 18. In such embodiments, the human operator may initiate a velocity command for the motorized trolleys 18 quite apart from that generated proportional to the CAS measurements.

As further shown in FIG. 3, the operator may initiate a velocity command by, for example, actuating a pushbutton which provides an input signal at 360 to the controller to either add in velocity command values to those computed from the CAS signals, as illustrated in FIG. 3 at 340, or replace them altogether. These velocity commands may cause the crane to move without any effort on the part of the operator. Also as illustrated in FIG. 3, heading information for auxiliary velocity commands may be obtained from the CAS at 320 and a heading estimate may be determined at 370. A trajectory generator at 380 may determine the additional velocity commands based on the heading estimate and the input signal.

IADs typically provide some means of connecting the bottom of the cable to the payload, as shown in FIGS. 1a and 1b at 24. This connection may be as simple as a hook, but it is typically some form of "end effector." End effectors are specialized devices that serve to grip and release the payload, and often provide various task-specific functions, such as payload reorientation. In addition, end effectors may provide handles and various push-button controls for the operator, including but not limited to push-button functions of grip/release and up/down. These handles may provide a natural location for an auxiliary button. In the event that handles are not present, a button may either be mounted to the end effector, or hung from the crane like a pendant control. The button may be a wireless control using any of a number of wireless techniques known in the art.

Figure 4:
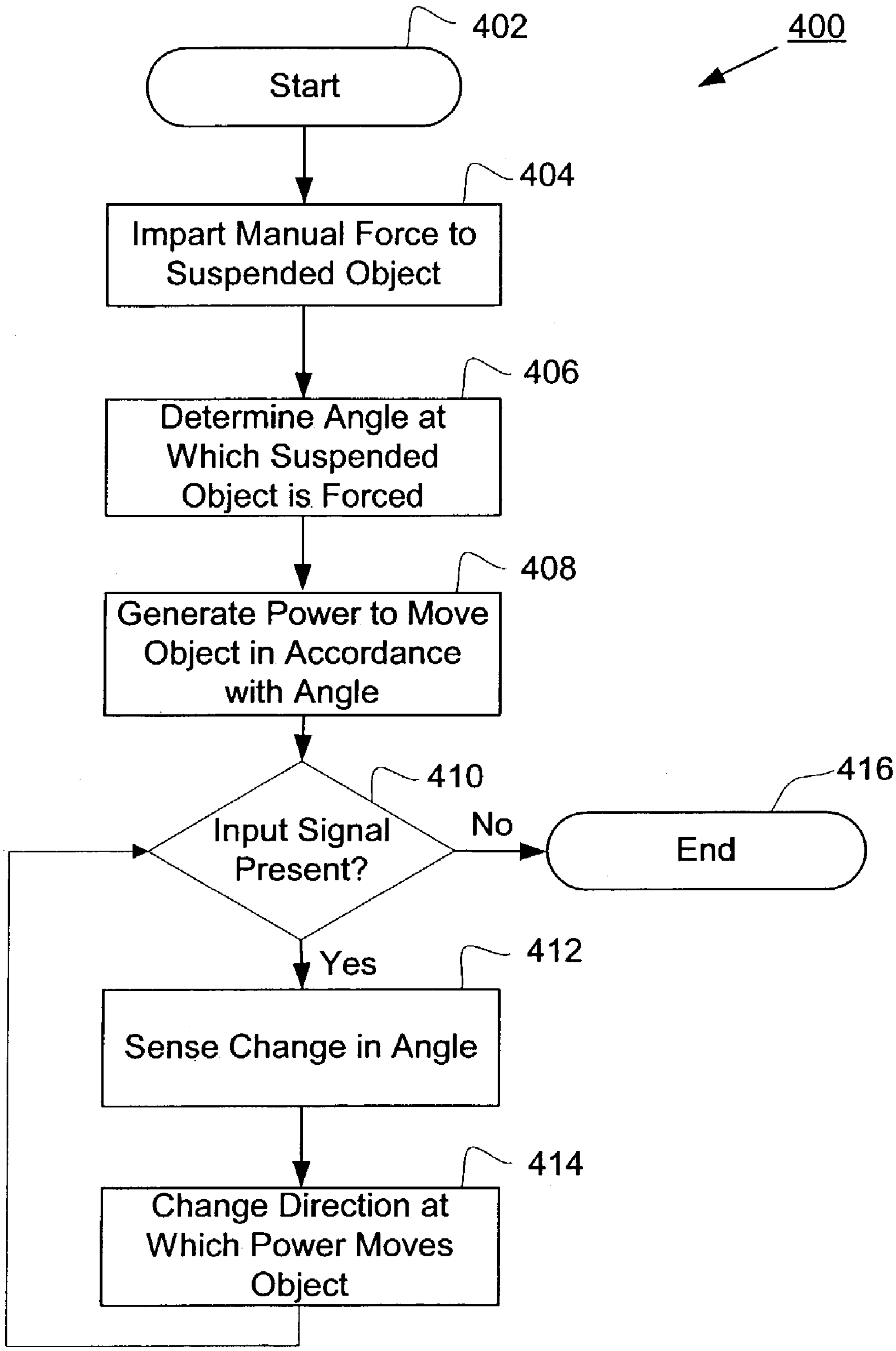
FIG. 4 is a schematic flow diagram of at least one embodiment of an intelligent assist method of the present invention.

FIG. 4 illustrates at least one embodiment of an intelligent assist method 400 for moving a suspended object. The method may commence at 402. The operator may impart manual force to a suspended object at 504. At 506, an angle at which the suspended object is manually forced may be determined, relative to a vertical axis. Then, motorized power may be generated at 408 to move the object in accordance with the angle at which the suspended object is manually forced. At 410, a signal may be inputted to continue the motorized power and enable the object to continue moving in accordance with the angle at which the suspended object is manually forced. If the input signal is present, the method may continue. If the operator imparts an additional force to the object to change the direction in which the object is moving, any change in the angle may be sensed at 412. The direction at which the motorized power moves the object may be changed at 414, based upon the sensing. Motorized power may be maintained such that the object moves in the desired direction until the input signal is no longer present, as represented at 410. If no input signal is present, the method ends at 416.

The input signal may be a continuous signal. For example, the operator may have to keep a pushbutton actuated continuously while the object is in motion. Alternatively, the operator may only have to generate a signal pulse. For example, the operator may only have to actuate a pushbutton once to continue the motorized power and enable the object to continue to move in accordance with the angle at which-the suspended object is manually forced.

Figure 5A:
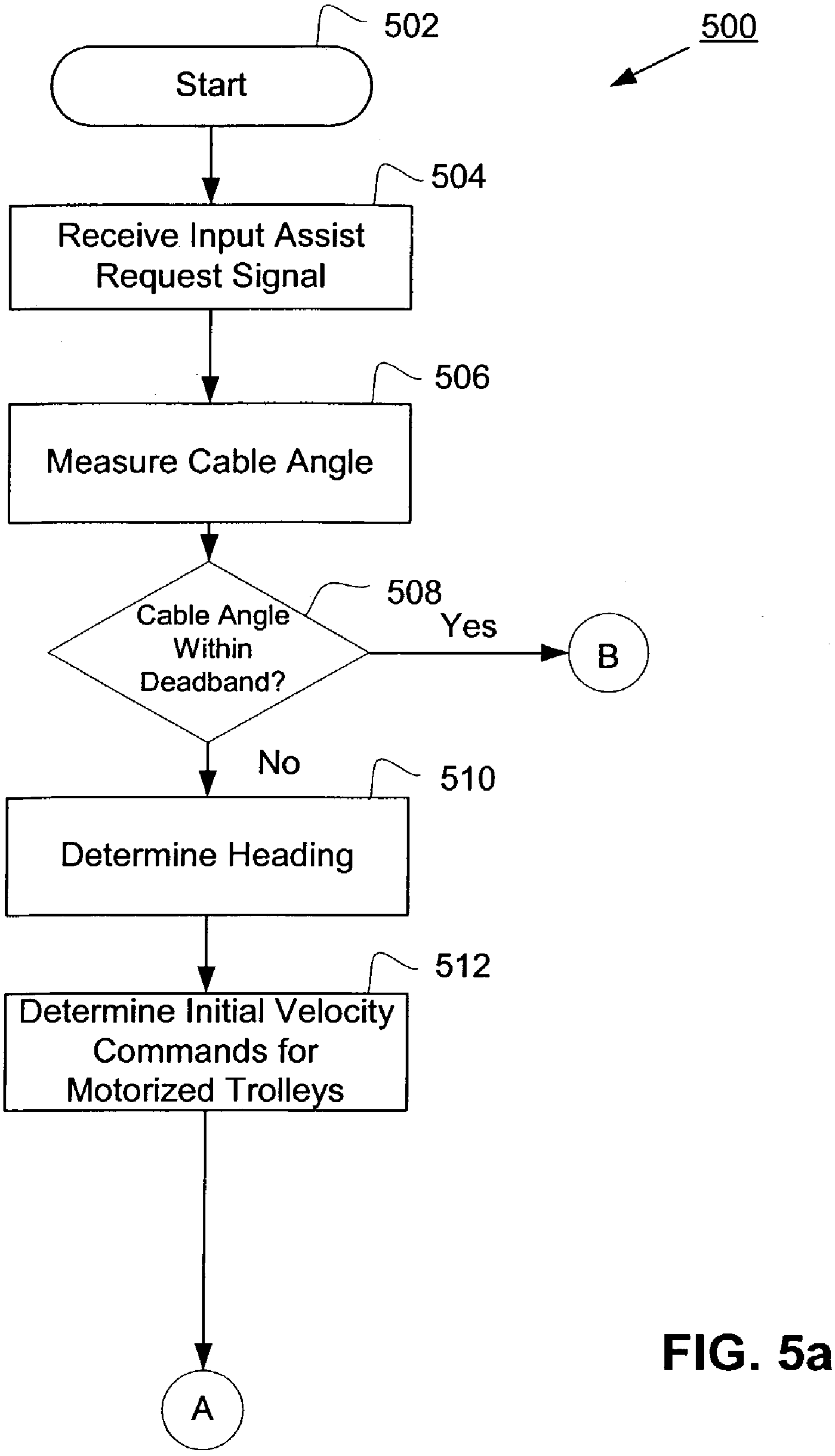
FIGS. 5*a*–5*b* are a schematic flow diagram of at least one embodiment.
Figure 5B:
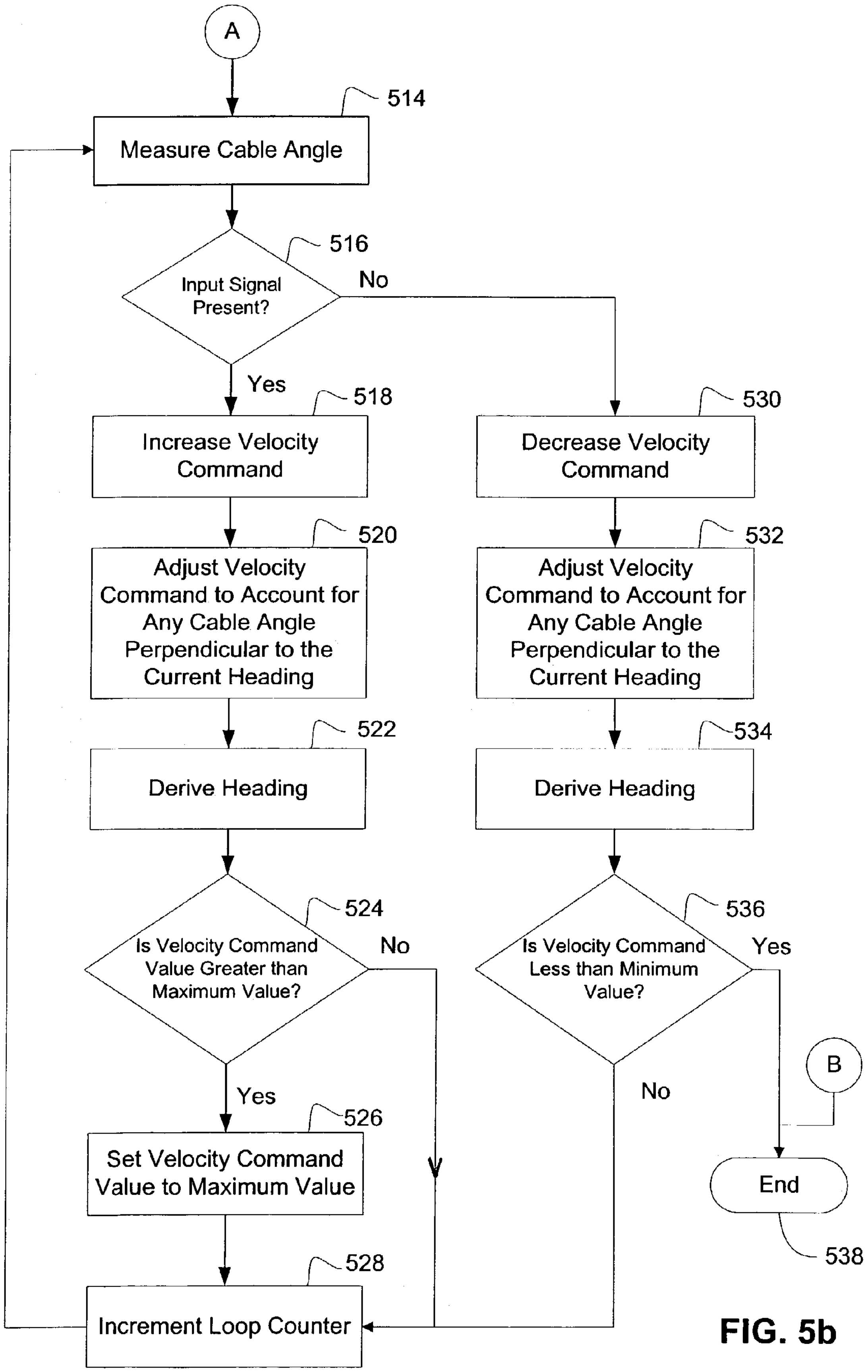

FIGS. 5*a*–5*b* illustrate one embodiment of an intelligent assist method 500, or application, used by a controller for determining velocity commands for the motorized trolleys 18. In at least one embodiment, the method 500 may be implemented using program instructions of the application 30. The intelligent assist method 500 may commence at 502. Control may proceed to 504, at which the controller receives an input assist request signal from the operator. The signal may be outputted from the operator input device as discussed above. For such embodiments, the operator input device may be an auxiliary button that acts as a momentary switch that the operator must keep actuated so long as he/she wishes for there to be an auxiliary velocity command input present. When the button is initially actuated, the controller may receive the input assist request signal at 504.

Upon receiving the signal, the controller then may measure the cable angle, as measured by the cable angle sensor, at 506. Control may then proceed to 508, at which the controller determines whether the cable angle is within the deadband.

The deadband may be determined by applying a deadband function to the x axis and y axis cable angle readings separately, or it may preferably be determined by applying a deadband function to the combined value:

$$|\Theta| = [\hat{\theta}_x^2 + \hat{\theta}_y^2]^{1/2}$$

Figure 6:
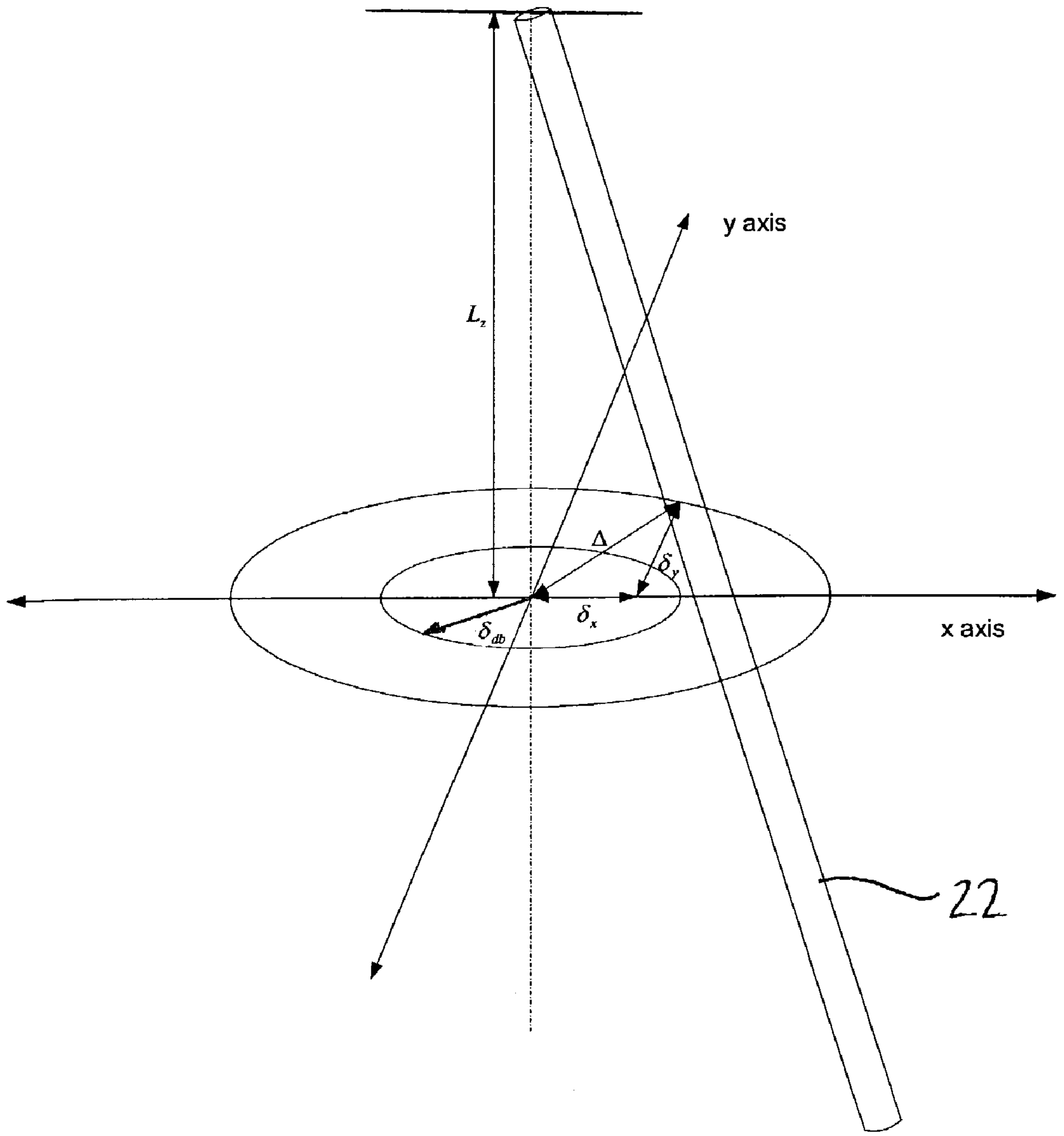
FIG. 6 is a partial perspective view of a cable that has been deflected in accordance with an embodiment of the intelligent assist device.

This may result in defining a circular deadband such as that illustrated in FIG. 6. In FIG. 6, cable displacements rather than cable angles are illustrated. The two may be related as follows:

$$|\Theta| = \tan^{-1}\left(\frac{\Delta}{L_z}\right),\ \theta_x = \tan^{-1}\left(\frac{\delta_x}{L_z}\right),\ \theta_y = \tan^{-1}\left(\frac{\delta_y}{L_z}\right)$$

If it is not the case that |Θ| is greater than the deadband value, then no viable heading information is available, and control may proceed to 538 at which the application 500 is ended. The operator, therefore, must push the payload enough to move the cable angle outside the deadband in order to cause IAD movement.

When the cable angle is outside the deadband, control may proceed to 510, at which a unit heading vector h may be determined from the cable angle measurements. The vector h is the direction associated with Δ in FIG. 6. The initial velocity may be determined based on the cable angle. As discussed above, the initial velocity may be determined in proportion to the cable angle, or integral control may be used to determine the initial velocity.

Control may then proceed to 514, at which the cable angle is measured again to ensure that the initial velocity commands are as accurate as possible. The controller may then determine whether the input signal is still present at 516. If the input signal is present, e.g., the pushbutton is still actuated, control may proceed to 518, at which the velocity command value may be increased. The increase of the velocity command value may be predetermined. For example, the velocity command value may be increased by an amount Adt during each computational time step of length dt. Here, A represents the desired acceleration of the crane. In this way, the crane may begin to move the payload without any additional effort on the part of the operator. The operator will simply need to walk along with the payload as it moves, while actuating the pushbutton, or other simple input device.

In addition, the controller may continue to adjust the velocity command to account for any cable angle in the direction perpendicular to the current heading ($\Theta_\perp$) at 520. This adjustment may be proportional to $\Theta_\perp$. Thus, by pushing or pulling the payload side-to-side, the operator may modify the heading. Control may proceed to 522, at which the controller may derive an updated heading based on the velocity command. The controller may then determine whether the velocity command value is greater than a predetermined maximum value at 524. If the velocity command value is greater than a predetermined maximum value, the controller may set the velocity command value to the maximum value at 526 and control may proceed to 528, at which a loop counter may be incremented. If the velocity command value is not greater than the maximum value, the controller may not adjust the velocity command value and control may proceed to 528, at which the loop counter may be incremented.

Control may then proceed back to 514, at which the cable angle is measured. The controller then may determine whether the input signal is still present at 516. In this embodiment, if the input signal is no longer present, e.g., the operator releases the auxiliary button, the controller may decrease the velocity command value at 530. The quantity of decrease of the velocity command value may be predetermined. For example, the velocity command value may be decreased by an amount Adt during each computational time step of length dt.

In addition, the controller may continue to adjust the velocity command to account for any cable angle in the direction perpendicular to the current heading ($\Theta_\perp$) at 532. This adjustment may be proportional to $\Theta_\perp$. Thus, by pushing or pulling the payload side-to-side, the operator may modify the heading. Control may then proceed to 534, at which the controller may derive an updated heading based on the velocity command. The controller may then determine whether the velocity command value is less than a predetermined minimum value at 536. If the velocity command value is less than a predetermined minimum value, the controller may exit the application at 538. If the velocity command value is not less than the minimum value, control may proceed to 528, at which a loop counter may be incremented. Thus, when the velocity drops below some predetermined minimum, the application may be exited, and the controller may wait for another input signal.

There are, of course, many alternative embodiments of the method 500. As described, the method 500 produces a trapezoidal velocity profile: constant acceleration, followed by constant velocity, followed by constant deceleration. Many other profiles are possible including, but not limited to, those with asymmetric acceleration and deceleration, and those based on smooth curves, such as minimum jerk profiles, and Gaussian profiles. It is also possible to make the velocity profile dependent upon the current state of the crane. For example, the computation of the velocity command may take the form:

$$v_{k+1}^{cmd} = v_k^{cmd} + \frac{v_{\max} - |v^{meas}|}{\tau} h_k dt + G\Theta_\perp$$

Here, $v^{meas}$ is the measured crane velocity, and $\tau$ is a selectable time constant. This implementation has the effect of reducing the acceleration gradually as the crane approaches maximum velocity.

In another embodiment, the initial heading may be determined not from the cable angle sensor information, but from a priori knowledge of the task. In such embodiments, the operator may therefore never have to apply any force to the payload at all, except to modify the heading.

In another embodiment, adjustable limits may be placed on how large the change in heading (due to $\Theta_\perp$) may be, to ensure that an operator does not oversteer the system.

In another embodiment, the heading may be determined based on a measurement of the actual crane velocity, rather than the commanded velocity:

$$h_{k+1} = \frac{v_{k+1}^{measured}}{|v_{k+1}^{measured}|}$$

In another embodiment, the method for determining the velocity command may contain a term proportional to the full cable angle signal, not just the component perpendicular to the instantaneous heading. In this way, the operator may push on the payload to gain additional acceleration, or pull on it to gain additional deceleration. In such embodiments, the system maintains the "deswinging" characteristic of the basic CAS controller.

Figure 7:
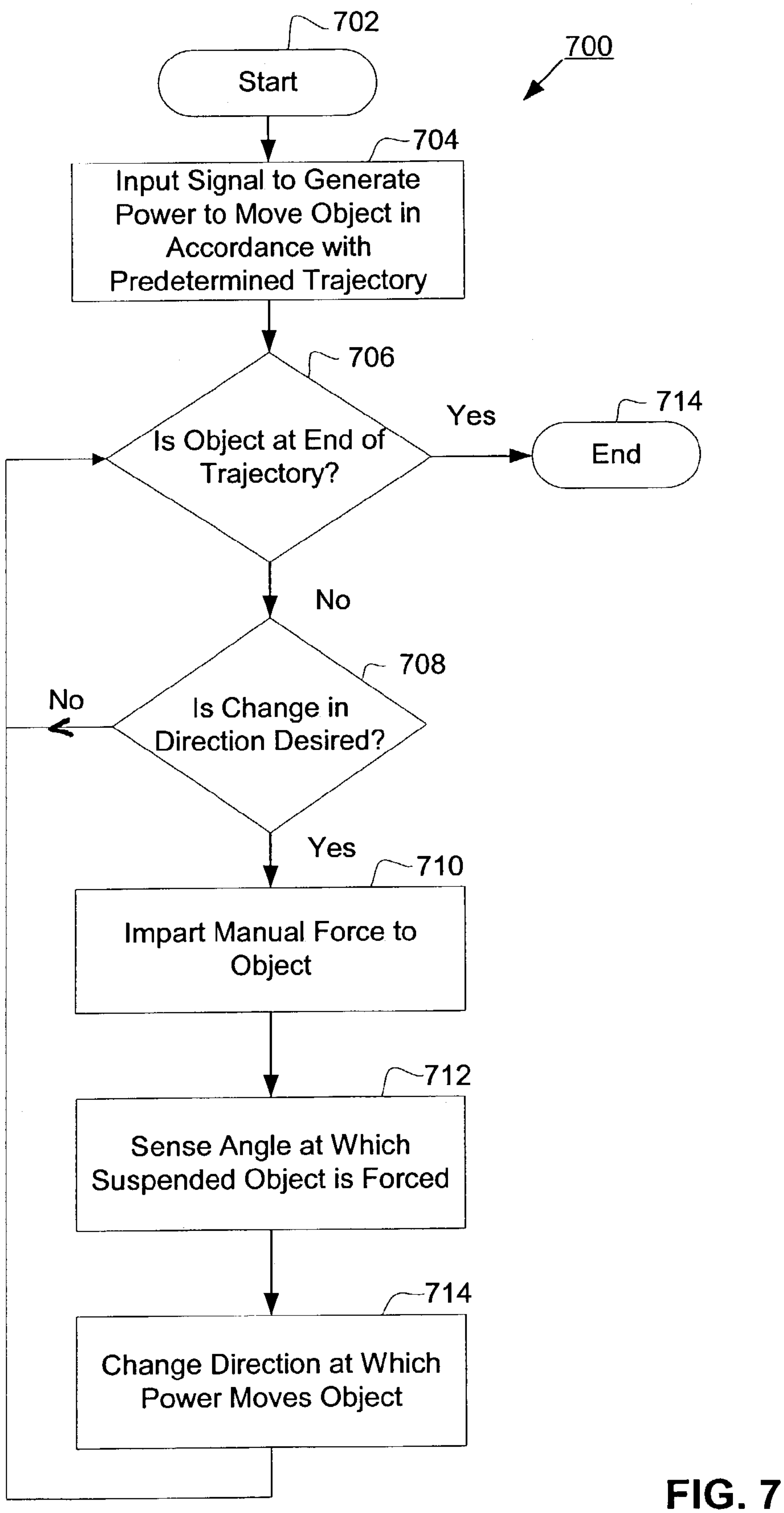
FIG. 7 is a schematic flow diagram of at least one embodiment of an intelligent assist method of the present invention.

FIG. 7 illustrates at least one embodiment of an intelligent assist method 700 for moving a suspended object. The method may commence at 702. At 704, a signal may be inputted to generate motorized power to move a suspended object in accordance with a predetermined trajectory. That is, the desired velocity and heading may be determined based on one or more previously memorized positions. In this way, the position of the system at the time the button switch is actuated is treated as the initial position and the memorized position is treated as a target position to which the controller may drive the system along a trajectory. The trajectory parameters such as acceleration, deceleration, and maximum velocity may be different for each memorized position. The particular memorized position may be selected by the operator by actuating a dedicated button or by other means such as the load cell reading, the initial position, or an external device such as a programmable logic controller ("PLC") connected to the IAD by a communication link. The user may direct the system to terminate the motion to the target position by either releasing the button or momentarily actuating the button, depending on the mode of operation. Furthermore, the system may be configured to automatically terminate motion and come to a controlled stop based on the CAS signal exceeding a predefined limit.

As shown in FIG. 7 at 706, as long as the object is not at the end of the trajectory, the method may continue. At 708, if there is a desire to change the direction in which the object is moving, the method proceeds to 710. If the current trajectory is adequate, the object may continue to move along the current trajectory. To change the trajectory, in at least one embodiment, the operator may impart a manual force to the suspended object at 710. The angle at which the suspended object is manually forced may be sensed at 712. The direction at which the motorized power moves the object may be changed at 714, based upon the sensing. Thus, the ability to steer the system by means of deflecting the cable may be maintained. In at least one embodiment, the memorized target position may be dynamically modified based on the steering input. In addition, the target position may be further constrained to lie on a line defined by a pair of memorized positions or on curve which may be defined by a combination of memorized target position and a predefined distance from the initial position.

Embodiments may also include various precautionary checks. For example, if the IAD is outfitted with position sensors for the x and y coordinates, then it is possible to disallow the auxiliary trajectory in certain regions of the workspace. Such embodiments disallow trajectories that could potentially lead to collisions or undesired motion. Another check may involve monitoring the cable angle and taking action in the event of an excessive angle. The action may drop the velocity command to zero, or to revert to the standard mode in which velocity is proportional to cable angle.

In addition to modifications to the application, there are a variety of ways to treat the operator's auxiliary input. In at least one embodiment, the operator must keep a momentary switch actuated so long as he/she wishes the auxiliary velocity command to remain in force.

In another embodiment, the operator may actuate a momentary switch to signal the start of an auxiliary trajectory, and depresses it again to signal the end. The operator does not need to keep the switch actuated. Thus, the operator need not attend to the IAD after signaling the start of an auxiliary trajectory. The IAD may move autonomously while the operator attends to some other task. In another embodiment, the trajectory may have a pre-defined duration, or it may end as the result of some other condition, such as the IAD reaching a pre-defined region of the workspace.

In another embodiment, the operator may employ a toggle switch. Toggling from off to on may initiate the auxiliary trajectory, and toggling from on to off may end it.

In another embodiment, the operator may employ a proportional input device rather than a switch. Examples of proportional input devices include load cells that may be used to measure the force applied by the operator's thumb, a single-axis joystick, or any of a number of other devices well-known in the art. The velocity command may then be made proportional to the output signal from such a device.

It is to be understood that there are a variety of ways for the operator to control heading. In at least one embodiment, the operator may control heading based on the cable angle. Utilizing cable angle provides a highly intuitive approach because the operator simply pushes in the direction toward which he/she wishes to redirect the load.

In another embodiment, the operator may push a joystick or spring-centered rocker switch side-to-side indicating "go left" or "go right." However, because human operators tend to interpret left and right with respect to their own bodies, but in the absence of an orientation sensor (discussed below), the IAD controller has no information about which way the operator is facing. Very often, an operator will pull on a payload for one phase of a task and push it for another. Because of this, the direction of movement (the heading) is not necessarily indicative of which way the operator is facing.

In another embodiment, a rotational input, such as a steering wheel may be used. The rotational input may be spring-centered and easily rotated in either the clockwise or counterclockwise direction. For example, rotating this input in the clockwise direction may indicate to the IAD controller that the heading vector should also be rotated in a clockwise direction. Such an input device may allow the operator to influence the heading in an intuitive manner and with minimal force.

In another embodiment, the directions may be specified by a joystick, rocker switch, proportional rocker switch, force-sensitive input, or other control that may to be defined with reference to the present forward direction of the payload. For example, if a joystick is used, it may be mounted with its base plane turned to be a vertical plane facing the operator. Then, the up direction of joystick activation may be mapped to a "forward" direction, meaning to move more in the direction that the payload is already moving. The down direction of the joystick may be mapped to "reverse", the left direction of the joystick to a leftward turning of the payload relative to its present forward direction, and so on.

In at least one embodiment, the auxiliary button concept may be combined with the gain scheduling concept presented earlier. The operator actuates a momentary switch to signal that the next change of cable angle is to be interpreted specially. At the moment the switch is actuated, the output signal of the CAS may be read and stored as a baseline value. Any change from the stored baseline value that occurs within a short interval of time following the switch signal, even a change of smaller magnitude than the CAS deadband, may now be acted upon. A different gain may be applied to the increment of CAS signal detected. Alternatively, in addition to the concept of an auxiliary velocity command, the increment of CAS signal may be used to specify a direction and a velocity, which the trolley may adopt and hold until some future event terminates the held velocity. An example of such a terminating event may be a subsequent actuation of the button.

Another alternative form of gain scheduling is one in which selected parameters of the application illustrated in FIGS. 5*a*–5*b* may be adjusted according to a measure of the payload weight. Such a measure may be available from load cells mounted at the base of the cable. Payload weight may also be known a priori. It may be desirable, for example, to decrease the velocity increment Adt for larger payload weights. The size of the deadband and the responsiveness to steering ($G\Theta_{\perp}$) may also be adjusted according to payload weight.

In another embodiment, the auxiliary button concept may be used with IADs based on rigid descenders rather than cables or chains. The only difference in that case is that heading information cannot come from a CAS, because there is no CAS in such a device. Instead, heading information may come from the operator intent sensor used by the IAD. For example, an operator intent sensor such as a six-axis sensor that can detect the direction in which an operator is pushing may be used. If the IAD includes motorized trolleys for the x and y axes and also for rotation about the vertical axis, then "heading" may be interpreted as the direction that the operator is pushing in x and y along with the amount of twist that the operator is imparting. An auxiliary velocity may then be determined for all three axes of motion: x, y and twist. If the IAD includes a powered lift in the vertical direction, then the auxiliary velocity may then be determined for lifting as well. Further, if the IAD includes other powered axes, such as rotations about the x and y axes, the auxiliary velocity may be determined for the other powered axes as well.

Several of the techniques disclosed herein involve measuring the operator's motion intent with a sensor located on the payload or on the end effector that supports the payload. Because an operator may twist the payload arbitrarily about the cable, the sensor on the payload may not be aligned with the axes of the bridge crane. Thus, it may be necessary to measure the orientation of the payload relative to the bridge crane.

If the orientation of the end effector and payload are known relative to the crane, then a number of additional approaches to IAD control become possible. "Orientation" refers specifically to the rotation about a vertical axis necessary to "line up" the end effector with a given direction on the crane itself.

There exist a number of well-known sensors for measuring the orientation of a rotary joint. These include potentiometers, optical encoders, and the like. Measuring payload orientation, however, is more challenging, because the payload and overhead crane are typically separated by several feet of cable. If a swivel joint is included at the bottom of the cable, then the rotation of that joint can be measured, but there is no guarantee that all of the rotation will occur at that joint alone. The wire ropes typically used in IADs are prone to considerable twist under changes in tensile load. The sensor, therefore, needs to be insensitive to this twist, as the instrumented swivel just described would not be.

Figure 8:
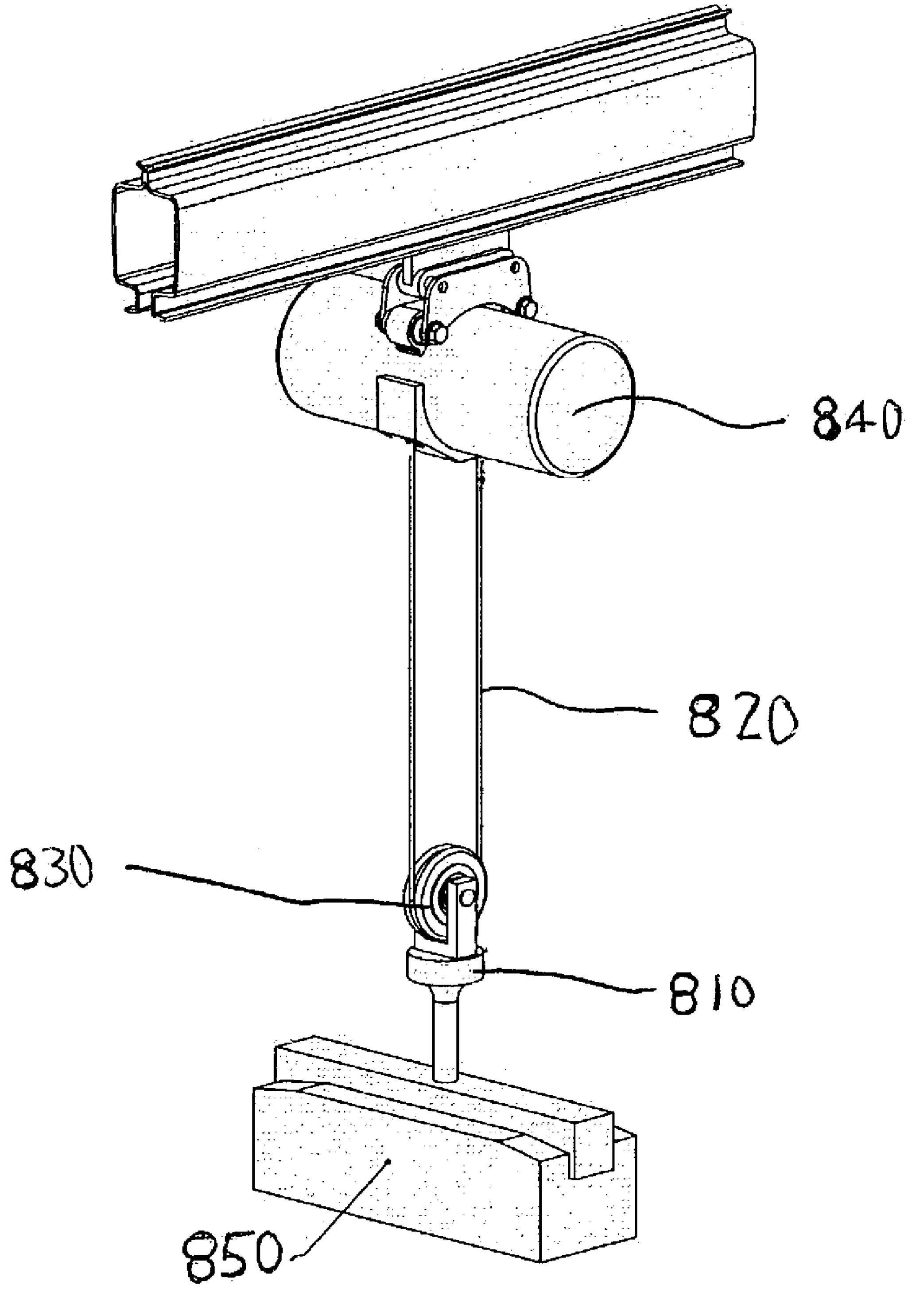
FIG. 8 is a partial top perspective view of another embodiment of the intelligent assist device.

In at least one embodiment, all of the twist may be isolated at a single rotary joint 810, as illustrated in FIG. 8, where it may be accurately measured. While difficult to achieve with a single cable, this may be accomplished with a "reeved" cable 820, as illustrated in FIG. 8. "Reeving" is defined as passing the end of the cable around a pulley 830 and fastening it to the body 840 of the hoist or balancer from which it originated. The payload 850 may then be hung from the axle of the pulley 830. Reeving may act as a 2:1 transmission, doubling the lifting capacity of a hoist or balancer, while cutting the speed in half. Reeving may be useful in the present context because the pulley axle may exhibit little to no twist about a vertical axis.

Thus, it is possible to create a single rotary joint about which the operator can twist the end effector and payload, and to measure the rotation of this joint. In one embodiment, the rotation sensor may provide absolute angle information, and may include a pair of conductive plastic rotary potentiometers. It will be understood that many other absolute or incremental techniques may also be used for measuring the rotation angle of the payload or end effector relative to the rail system, once the rotation angle has been concentrated at or near one joint. Notably, the rotation angle does not have to be measured with great accuracy, indeed it may be necessary only to measure it to an accuracy of tens of degrees. Since only an estimate of the rotation angle may be needed, types of rotational sensors may be used which in many other applications would be considered of poor resolution, such as a ring of discrete hall switches, or other methods known in the art.

In the present context, reeving may make the bottom of the cable, or in this case, the pulley assembly, resistant to twist. The twist may then be isolated in an instrumented rotary joint. There are, of course, many other ways to make the bottom of the cable resistant to twist including, but not limited to, the use of a rotation-resistant wire rope and the use of an anti-twist extension mechanism.

There are many examples of wire rope that are designed to resist rotation. They achieve this by the use of multiple sets of strands, some of which are wound in a right-hand helix, while others are wound in a left-hand helix.

An anti-twist extension mechanism may be provided in parallel with the cable. The mechanism must be able to move up and down with the cable, but resist rotation. There are many well-known mechanisms that will accomplish this, including telescoping joints (those with non-circular sections) and scissor-jack mechanisms. Another such mechanism is an articulated cable carrier. In addition to resisting rotation, this device may provide a convenient means of routing electrical, pneumatic, and hydraulic connections from the overhead crane to the end effector.

The orientation about a vertical axis of the payload and/or end-effector, relative to the rail system, may be measured by an AC electromagnetic technique. This method measures the orientation difference across an intervening large distance, e.g. from the rail system to the end effector, which may be several meters apart. Furthermore, the distance may change, as for example when a balancer or hoist is activated. This method does not rely on the concentration of the angle to be measured at one instrumented joint. This method may also be applied to IADs with rigid descenders just as easily as it is to IADs with cables or chains.

The AC electromagnetic sensor may use one or more transmitting coils and one or more receiving coils. In at least one embodiment, there may be one transmitting coil and two receiving coils, with the transmitting coil located at the end-effector and the receiving coils located above, near the rail system. However, the positions and/or numbers of the two kinds of coils may be exchanged. In at least one embodiment, an AC "excitation" current may be imposed on the transmitting coil, which may be about 10 cm in diameter and includes about 20 turns. The axis of symmetry of the transmitting coil may be substantially horizontal, and it is the purpose of the disclosed sensor to determine this axis and also its sense relative to the receiving coils. By "sense" it is meant that a half revolution of the coil's axis about a vertical axis is distinguishable from a full revolution. The frequency of excitation may be about 50 KHz and the excitation current may be about 250 mA., In one embodiment, the receiving coils, which may be about two in number, also have an axis of symmetry that may be substantially horizontal, and the two axes of the two coils may be substantially perpendicular to one another, while both lying in a substantially horizontal plane. The receiving coils may be of similar construction to the transmitting coils. In one embodiment, all the coils may be constructed of printed circuit boards etched in the form of a coil that may be a spiral shape on the printed circuit board. Many other ways of creating coils are known in the art.

In one embodiment, the transmitting coil may create an AC magnetic field in the vicinity of the end effector. The magnetic field may be of sufficient intensity and spatial extent such that it may be detectable several meters away. Lines of magnetic flux may pass through the transmitting coil parallel to its axis of symmetry, and everywhere the horizontal component of the lines of magnetic flux remain substantially aligned with the axis of the transmitting coil.

Thus, the lines of magnetic flux that pass through the receiving coils may induce within the coils a voltage proportional to the cosine of the angular misalignment between transmitting and receiving coils. The magnitude and phase of the induced voltage may be determined by synchronous (phase sensitive) detection techniques known in the art. By detecting two such induced voltages, in two substantially perpendicular receiving coils, including phase or sign information which is made available by the phase sensitive detection technique, the axis of the transmitting coil relative to one of the receiving coils may be determined and resolved into one angle within a complete range of about zero to about 360 degrees.

Because the distance separating the transmitting coil and receiving coils may vary greatly, moment to moment, in at least one embodiment an automatic gain control (AGC) circuit may be used to control the sensitivity of the detector. In one embodiment, the AGC circuit may comprise ganged MOSFET transistors driven by the greater of the two detected voltages from the two receiving coils. However many other ways of accomplishing detection and AGC are possible and will be evident to those skilled in the art.

Another approach to measuring end effector and payload orientation (for both rigid descender and cable or chain systems) is by way of a gyroscope (gyro). There are many types of gyros, including piezoelectric, silicon micromachined, mechanical, fiber optic, and ring laser. All of these are fundamentally intended to measure the rate of rotation about a given axis, not orientation. Orientation, however, may be estimated by integrating the rotation rate signal over time. However, small errors in the rotation rate estimate may accumulate over time, resulting in drift in the orientation estimate. This drift may be as little as a fraction of a degree per hour for a more expensive gyro, but may be well in excess of 100 degrees per hour for lower cost gyros.

Errors in orientation of about 10 to about 20 degrees are generally tolerable, but this means that an inexpensive gyro may provide a reliable estimate for only a matter of minutes if the drift is not corrected or reset in some way. Thus, a viable orientation sensor may include both a gyro and some means of resetting drift errors.

One simple means of resetting is to rely on the fact that IADs are typically used in repetitive tasks having a duration of about 5 minutes or less. Because tasks are repetitive, it is often possible to identify some phase of the task in which orientation is quite predictable. For instance, when using the IAD to pick a part from dunnage or to place a part in a fixture, the part (payload) orientation should be well known. Moreover, IADs typically have sensors, including global position sensors and load cells, which may be used to determine precisely when this phase of the task has been reached. For instance, a fixture is always in the same location, so it is only necessary to check that the IAD is in that location. These sensors may then trigger a drift reset.

Another simple means of reset is to have the operator rotate the payload into a known orientation (e.g., aligned with the overhead bridge rail) and then actuate a reset button. There are several other approaches to measuring payload orientation, including, but not limited to optical approaches, compasses, and cable vibrators.

For example, a CCD camera may be mounted on the crane and pointed downward to a high-contrast mark or set of lights on the end effector. From this image, the end effector orientation may be computed. Also, instead of a CCD camera, a simpler lateral effect photodiode (LEPD) may also be used to look at an array of lights. A LEPD computes the centroid of all the light impinging upon it; therefore, to compute an orientation, it is necessary to alternately turn on and off at least two light sources. Additional light sources may be used to ensure continuity of the orientation estimate even in the event of some sources being occluded. Alternately, this type of system may be used together with a gyro as discussed previously. The gyro may update the orientation estimate over short time scales while the optical system may eliminate drift. Many other modifications to this basic optical approach are possible. For example, the receiver may be mounted on the end effector while the lights are mounted on the crane. Also, different color lights may be used to make distinguishing between them simpler. This method applies to both rigid descender and cable or chain systems.

A magnetic compass provides a simple way of establishing orientation relative to the Earth's magnetic field. Thus, a compass placed on the end effector provides a good measure of orientation relative to the Earth-fixed frame of the crane. One difficulty with this approach is that large ferromagnetic objects may significantly distort the Earth's magnetic field locally. However, if such objects are either not present or are in fixed, known locations, compassing is a viable approach. Also it is possible in some instances to place compasses on both the crane and the end effector, and to use the difference of these two measures as an estimate of orientation. This approach works well if the magnetic field distortions are similar near the crane and near the end effector. This method applies to both rigid descender and cable or chain systems.

Figure 9:
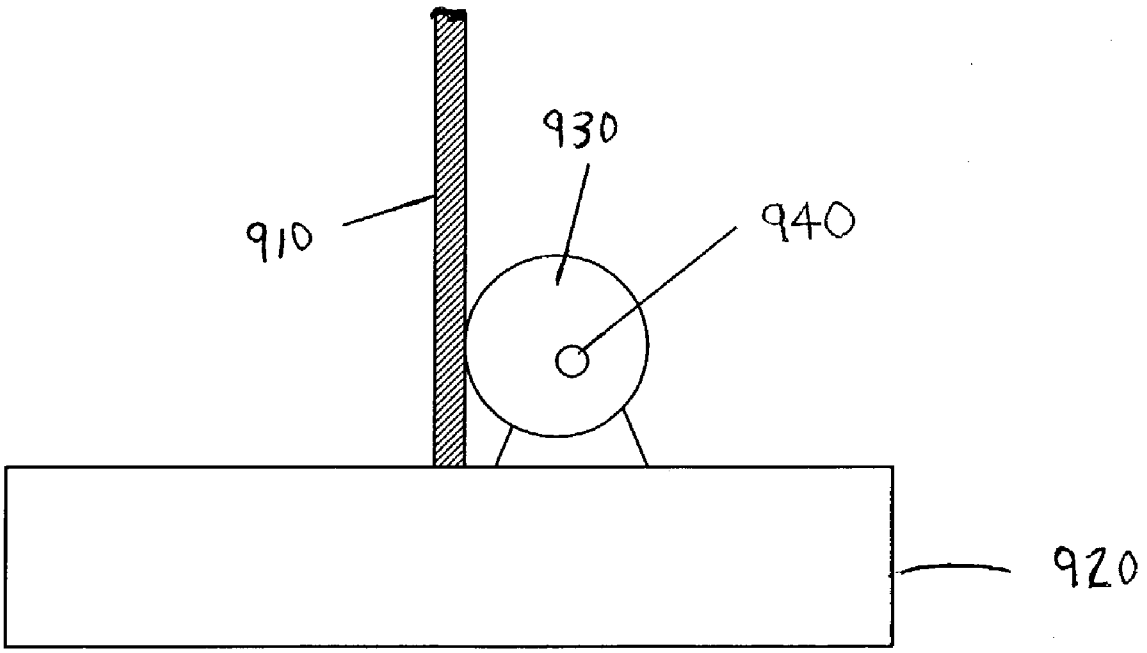
FIG. 9 is a partial schematic view of another embodiment of the intelligent assist device.

Another approach, illustrated in FIG. 9, involves mechanically vibrating the cable 910 along an axis that is fixed in the frame of the end effector 920. Vibrations may be generated, for instance, by an eccentric cam 930 mounted on a rotating shaft 940. The cam 930 presses against the cable as illustrated in FIG. 9, forcing it side-to-side at the frequency of rotation. The cable vibrations may then be detected by the CAS. Because the CAS measures in both x and y axes, it is possible to determine the orientation of the plane in which the cable 910 is vibrating. This may then be used as an estimate of the orientation of the end effector 920. Of course, there are many other ways to impart vibration to the cable. One small modification involves mounting an anti-friction bearing around the outer rim of the cam. In this way, slipping will occur between the cam and the bearing, rather than between the cam and the cable. This may minimize cable wear. Another technique may be to replace the cam with any of a number of well-known vibration sources, such as an electromagnetic torque motor, a voice-coil motor, a linear motor, or an inertial vibrator, or to use an AC magnetic field which induces a horizontal force in the cable, which must in this case be of magnetic material.

If the orientation of the end effector relative to the crane is known, for instance by using any of the techniques described above, then it is possible to mount a two-axis intent sensor to the end effector, and use the output of this sensor, properly rotated to account for orientation differences, to command the motorized trolleys.

Figure 10:
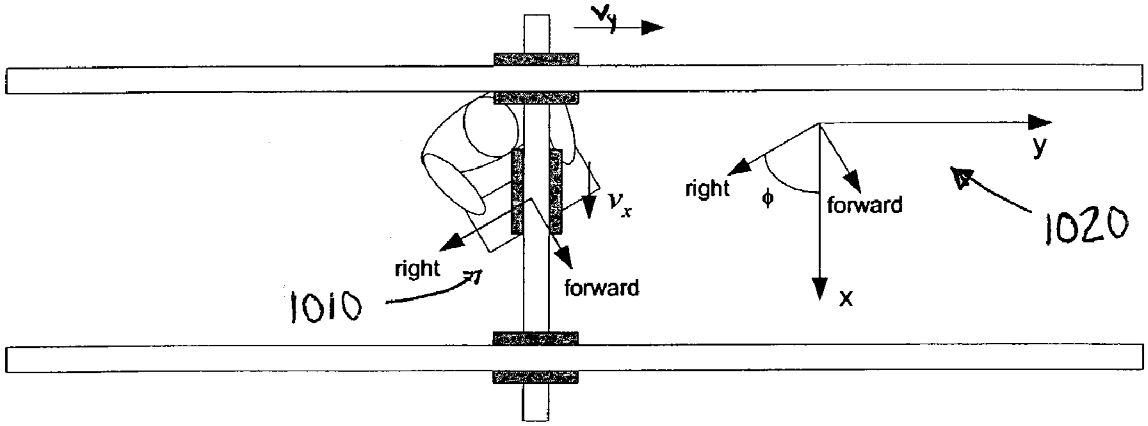
FIG. 10 is a top schematic view of another embodiment of the intelligent assist device.

As illustrated in FIG. 10, the forward-backward and right-left directions establish a natural coordinate system for a human operator 1010, while the bridge (x) and runway (y) directions describe a coordinate system 1020 in which the motorized trolleys act. Because these two coordinate systems rarely align, it is necessary to transform operator commands issued in frame 1010 before computing resultant trolley velocity commands to be executed in frame 1020. The necessary transformation is a rotation by orientation angle $\phi$:

$$\begin{bmatrix} v_x^{cmd} \\ v_y^{cmd} \end{bmatrix} = c\begin{bmatrix} \sin\phi & \cos\phi \\ \cos\phi & -\sin\phi \end{bmatrix}\begin{bmatrix} u_{f-b} \\ u_{r-l} \end{bmatrix}$$

Here, $u_{f-b}$ and $u_{r-l}$ are commands generated by the operator, $$v_x^{cmd} \text{ and } v_y^{cmd}$$

are commands issued to the motorized trolleys, c is a gain, and the matrix of sines and cosines is a rotation matrix. It should be understood that the key point illustrated in this equation is the rotation of commands issued in frame 1010 to commands executed in the frame 1020. Although this equation simply scales those rotated commands by a factor c, more complex operations such as integration, differentiation, thresholding and saturation may be applied. These operations are well known in the art.

The commands $u_{f-b}$ and $u_{r-l}$ may arise from operator actuation of a proportional two-axis input device, such as a two-axis joystick, trackball or two-axis loadcell. Many other configurations are possible, however, including two single-axis proportional sensors, or a sensor having more than two axes. The input device may be mounted in a variety of ways, as suits the application. For example, the device may be mounted at the base of a set of handlebars. Alternatively, the sensor may be small enough to fit under an operator's thumb. There is no limit on configuration: it is only necessary that the operator be able to generate two independent sets of commands. The commands do not even need to be proportional. One simple alternative would comprise a set of four momentary switches, one each for forward, backward, right and left commands. Pushing the forward button would lead to acceleration in the forward direction so long as the button was held down and a maximum speed was not reached, in a method analogous to that illustrated in FIGS. 5*a*–5*b*. Releasing the button would result in deceleration to zero speed. The other buttons would operate in similar fashion. Many other variations on this algorithm are of course possible, and would be apparent to one skilled in the art.

The method described here of rotating commands issued in frame 1010 to commands executed in frame 1020 is applicable to both IADs based on rigid descenders and IADs based on cables or chains. In the latter case, it is possible to combine this method with control based on cable angle sensing. The two methods are highly complementary. Control based on cable angle sensing is highly intuitive in that the operator simply pushes the payload in the direction and at the speed he or she wishes it to go. As discussed previously, this type of control also naturally deswings the payload. Control based on a two-axis input device is not as straightforward because it requires that the operator manipulate the input device rather than the payload itself. Moreover, control based on a two-axis input device does not necessarily provide deswinging. Nonetheless, there is one compelling reason to use the two-axis input device: it requires close to zero effort on the part of the operator. A combined method may simply combine the two types of commands:

$$\begin{bmatrix} v_x^{cmd} \\ v_y^{cmd} \end{bmatrix} = c_1 \begin{bmatrix} \sin\phi & \cos\phi \\ \cos\phi & -\sin\phi \end{bmatrix} \begin{bmatrix} u_{f-b} \\ u_{r-l} \end{bmatrix} + c_2 \begin{bmatrix} \hat{\theta}_x^{db} \\ \hat{\theta}_y^{db} \end{bmatrix}$$

Because of the two-axis input device, very little effort is required to initiate, sustain, or arrest motion. Nonetheless, the operator may push on the payload directly, and the payload will respond, which is often useful for fine positioning. Moreover, the use of cable angle sensing provides deswinging, whether the operator pushes on the payload or not. Many possible modifications of this basic algorithm, such as integral control of cable angle, would be obvious to one skilled in the art.

In addition to overhead bridge rail systems, there are other crane designs that utilize different geometries. One is the "gantry crane," which, like the bridge crane, provides motion in x and y directions, but which replaces the overhead y-axis rails with floor-mounted y-axis tracks. An inverted U structure rides in the tracks, and the top of this structure is the x-axis rail. Another geometry is the jib crane, in which a single rail pivots about a vertical axis. Thus, the jib, instead of having xy geometry, has rθ geometry.

While many embodiments of the present invention have been shown and described, it is evident that variations and modifications are possible that are within the scope of the present invention described herein.

What is claimed is:

1. An intelligent assist method comprising:

imparting a manual force to a suspended object;

determining a direction in which the suspended object is manually forced;

generating motorized power to move the suspended object in the direction; and inputting a signal to an operator input device that is independent from a signal generated from imparting the manual force to the suspended object to continue the motorized power and enable the suspended object to continue moving in the direction, even when the manual force is no longer imparted to the suspended object.

2. The intelligent assist method of claim 1, further comprising sensing a change in the direction in which the suspended object is manually forced; and changing the direction at which the motorized power moves the suspended object based upon the sensing.

3. The intelligent assist method of claim 1, wherein inputting the signal is continuous.

4. The intelligent assist method of claim 1, wherein inputting the signal occurs once.

5. The intelligent assist method of claim 1 further comprising increasing velocity so long as the inputting of the signal is continued until a maximum velocity is reached.

6. An intelligent assist method comprising:

receiving an input assist request signal at a controller;

measuring a cable angle;

determining an initial heading based on the cable angle;

determining a velocity command value for at least one motorized trolley, wherein the velocity command value is based on the cable angle;

adjusting the velocity command value based on the input assist request signal, the input assist request signal being different than and independent of the cable angle measurement;

deriving an updated heading based on the velocity command value; and outputting the velocity command value to the at least one motorized trolley.

7. The intelligent assist method of claim 6, further comprising adjusting the velocity command value to account for any cable angle perpendicular to the heading.

8. The intelligent assist method of claim 6, further comprising comparing the magnitude of the velocity command value with a predetermined velocity threshold.

9. The intelligent assist method of claim 6, wherein adjusting the velocity command includes increasing the velocity command value if the input assist request signal is present.

10. The intelligent assist method of claim 6, wherein adjusting the velocity command value is further based on an acceleration value.

11. An intelligent assist method comprising:

inputting a signal to generate motorized power to move a suspended object in accordance with a predetermined trajectory, wherein the predetermined trajectory is based upon the initial position of the suspended object and a predetermined target position;

imparting a manual force to the suspended object to change the trajectory;

sensing an angle at which the suspended object is manually forced; and changing the direction at which the motorized power moves the suspended object based upon the sensing.

* * * * *